United States Patent
Dichtel et al.

(10) Patent No.: US 10,237,130 B2
(45) Date of Patent: Mar. 19, 2019

(54) METHOD FOR PROCESSING VXLAN DATA UNITS

(71) Applicant: 6WIND, Montigny le Bretonneux (FR)

(72) Inventors: Nicolas Dichtel, Ittenheim (FR); Vincent Jardin, Saint Cyr L'ecole (FR)

(73) Assignee: 6WIND, Montigny le Bretonneux (FR)

( * ) Notice: Subject to any disclaimer, the term of this patent is extended or adjusted under 35 U.S.C. 154(b) by 103 days.

(21) Appl. No.: 15/301,652

(22) PCT Filed: Mar. 27, 2015

(86) PCT No.: PCT/EP2015/056755
§ 371 (c)(1),
(2) Date: Oct. 3, 2016

(87) PCT Pub. No.: WO2015/150272
PCT Pub. Date: Oct. 8, 2015

(65) Prior Publication Data
US 2017/0033992 A1 Feb. 2, 2017

(30) Foreign Application Priority Data
Apr. 2, 2014 (EP) .................. 14305486

(51) Int. Cl.
*H04L 12/24* (2006.01)
*H04L 12/46* (2006.01)
(Continued)

(52) U.S. Cl.
CPC ...... *H04L 41/0816* (2013.01); *H04L 12/4633* (2013.01); *H04L 12/4641* (2013.01);
(Continued)

(58) Field of Classification Search
CPC ............ H04L 12/4633; H04L 12/4641; H04L 41/0816; H04L 45/028; H04L 49/65; H04L 12/4675
(Continued)

(56) References Cited

U.S. PATENT DOCUMENTS 6,226,680 B1 * 5/2001 Boucher .................. G06F 5/10
709/230
8,978,031 B2 * 3/2015 Kamble .............. G06F 9/45558
370/351
(Continued)

OTHER PUBLICATIONS

International Search Report PCT/EP2015/056755, dated May 18, 2015, 3 pages.
(Continued)

*Primary Examiner* — Man U Phan
(74) *Attorney, Agent, or Firm* — Patterson Thuente Pedersen, P.A.

(57) ABSTRACT

A process for processing VxLAN data units in an environment that includes an operating system configured for processing VSLAN data units, and a fast path environment configured for receiving incoming VxLAN data units and capable of processing such VxLAN data units. The process comprises obtaining VxLAN processing configuration parameters used by the operating system, configuring the fast path environment for processing received VxLAN data units based on the obtained parameters, and selecting, at the fast path environment, at least one received VxLAN data unit for processing by the operating system.

9 Claims, 3 Drawing Sheets

(51) Int. Cl.
*H04L 12/759* (2013.01)
*H04L 12/931* (2013.01)

(52) U.S. Cl.
CPC ........ *H04L 12/4675* (2013.01); *H04L 45/028* (2013.01); *H04L 49/65* (2013.01)

(58) Field of Classification Search
USPC ................ 370/235–241, 254–328, 389–392; 709/224–245
See application file for complete search history.

(56) References Cited

U.S. PATENT DOCUMENTS

| | | | | |
|---|---|---|---|---|
| 9,130,879 | B2* | 9/2015 | Petrus | H04L 69/22 |
| 9,148,402 | B2* | 9/2015 | Pratapa | H04L 61/255 |
| 9,847,937 | B2* | 12/2017 | Vovnoboy | H04L 45/566 |
| 2001/0023460 | A1* | 9/2001 | Boucher | G06F 5/10 |
| | | | | 709/250 |
| 2014/0056151 | A1 | 2/2014 | Petrus et al. | |
| 2014/0059537 | A1 | 2/2014 | Kamble et al. | |
| 2015/0096009 | A1* | 4/2015 | Zoulias | H04L 63/0245 |
| | | | | 726/13 |
| 2015/0264116 | A1* | 9/2015 | Weiny | H04L 45/04 |
| | | | | 709/224 |
| 2016/0057098 | A1* | 2/2016 | Han | H04L 61/103 |
| | | | | 370/390 |

OTHER PUBLICATIONS

PCT Written Opinion of the International Searching Authority for PCT/EP2015/056755, dated May 18, 2015, 7 pages.

Draft: VXLAN: A Framework for Overlaying Virtualized Layer 2 Networks over Layer 3 Networks: (referenced draft-mahalingam-dutt-dcops-vxlan-08, available at http://tools.ietf.org/html/draft-mahalingam-dutt-dcops-vxlan-08), which has not yet been finalized.

* cited by examiner

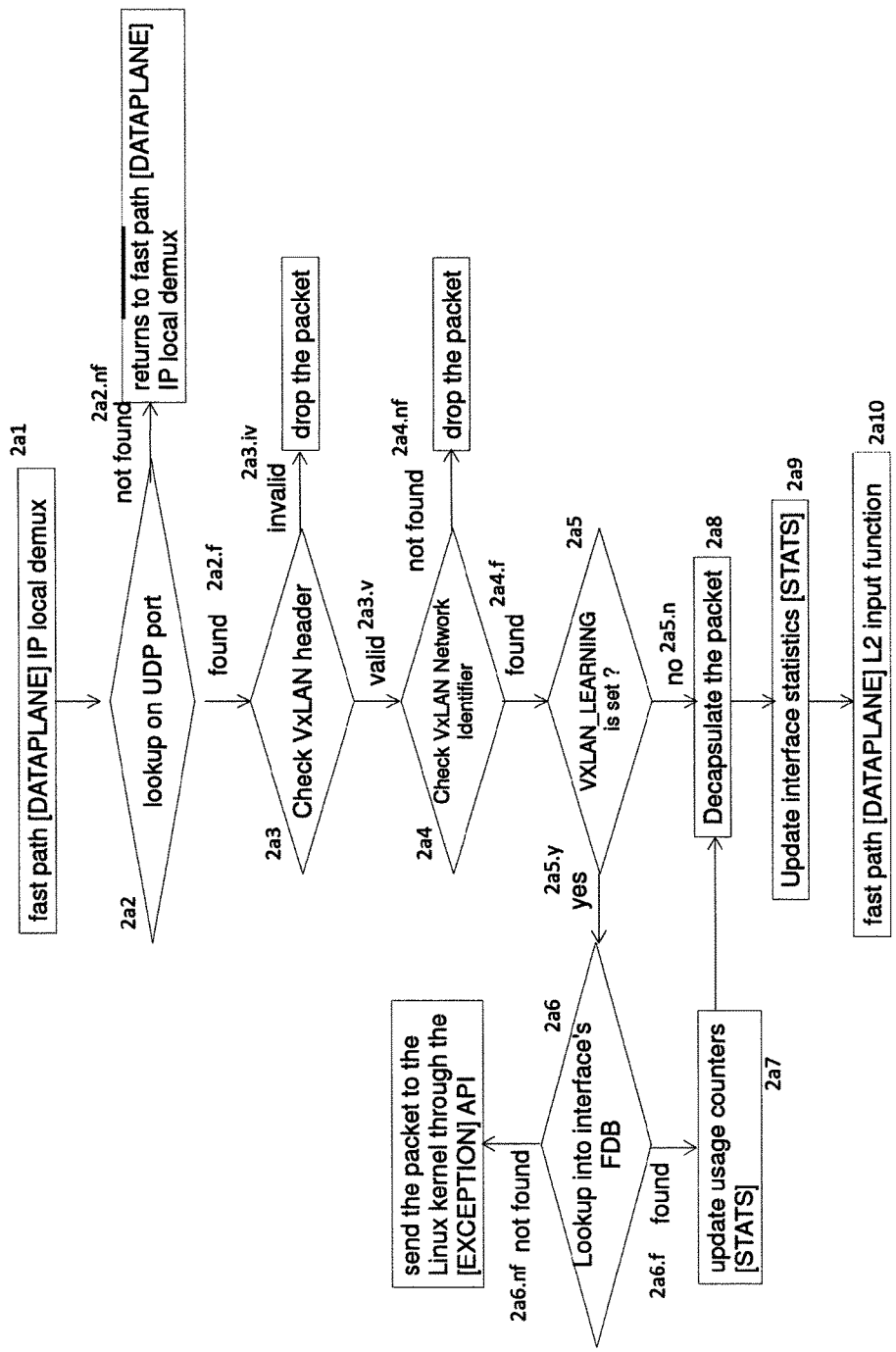
Figure 2.a

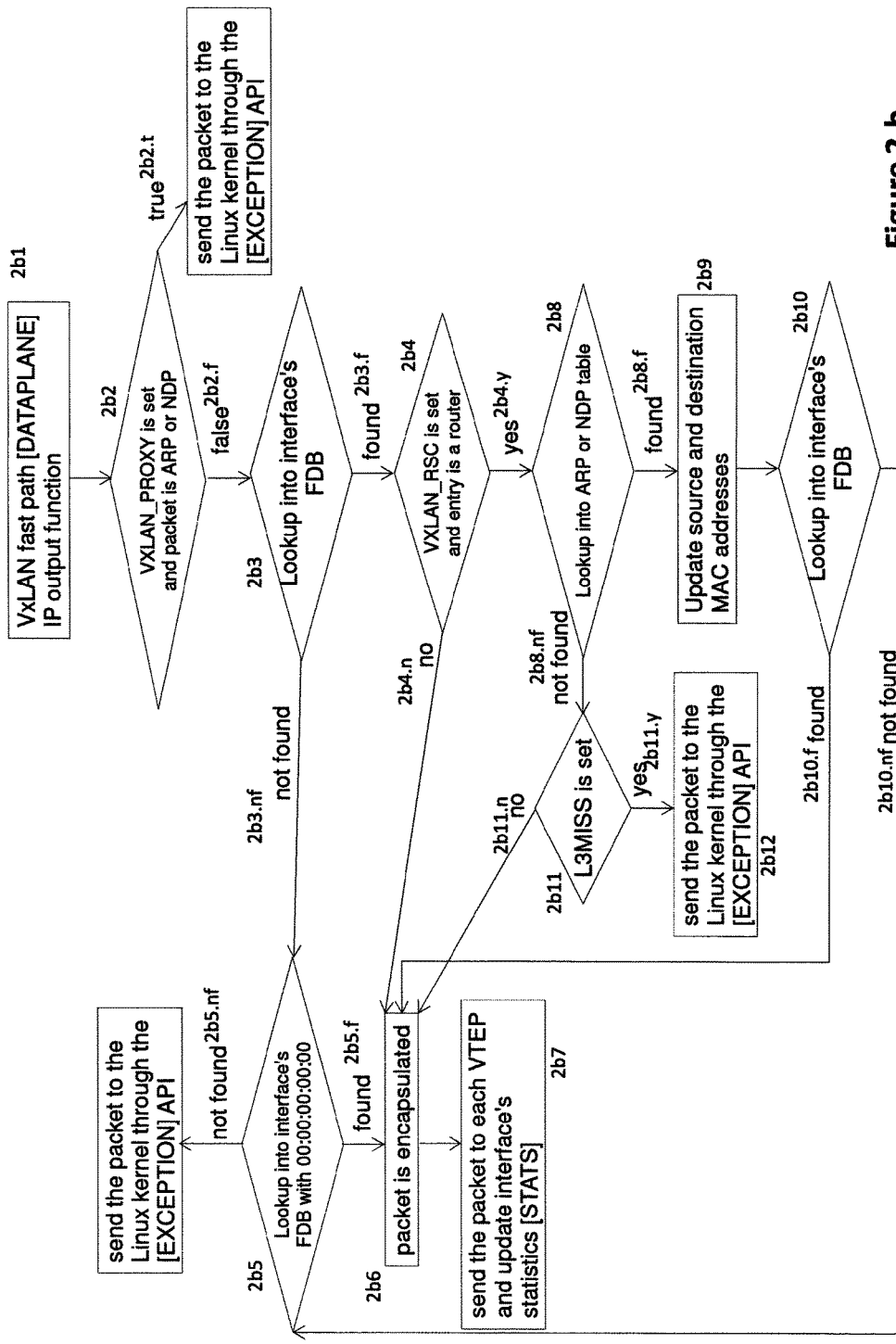
Figure 2.b

METHOD FOR PROCESSING VXLAN DATA UNITS

RELATED APPLICATIONS

The present application is a National Phase entry of PCT Application No. PCT/EP2015/056755 filed Mar. 27, 2015, which claims priority from EP Patent Application No. 14305486.4, filed Apr. 2, 2014, said applications being hereby incorporated by reference herein in their entirety.

FIELD OF THE INVENTION

The present disclosure relates to the field of packet processing in an environment that includes an operating system configured for processing VxLAN data units, such as the Linux operating system.

BACKGROUND OF THE INVENTION

Such environments may include L2 over L3 packet communication protocols for transporting Layer 2 data units over Layer 3 data units. For example, the Linux operating system was recently extended to include an IETF specified Ethernet over UDP protocol known as VxLAN.

The VxLAN protocol is described by an IETF draft entitled "VXLAN: A Framework for Overlaying Virtualized Layer 2 Networks over Layer 3 Networks" (referenced draft-mahalingam-dutt-dcops-vxlan-08, and available at http://tools.ietf.org/html/draft-mahalingam-dutt-dcops-vxlan-08), which has not been finalized yet.

The VxLAN processing is instantiated on Linux using a L2 over one or several UDP terminations into the Linux kernel, then these terminations of UDP packets lead to processing the packets through Linux logical interfaces (also referred to as netdevices) which are the management entities of VxLAN.

To handle incoming VxLAN packets, the Linux kernel opens an UDP socket to receive all packets with a destination address and an UDP port of one of the configured VxLAN interfaces. Then, the Linux kernel checks the VxLAN Network Identifier to find the proper VxLAN interface.

If the feature IFLA_VXLAN_LEARNING has been set, the Linux kernel checks if there is an entry into the forwarding database (FDB) for the inner source MAC address of the VxLAN packet. If not, the Linux kernel updates the FDB database.

After that, the packet is decapsulated (VxLAN header is removed and ECN status is updated accordingly) and injected again into the networking stack of the Linux kernel.

When the Linux kernel needs to send a packet via a VxLAN interface, it calls a transmit (xmit) function of the VxLAN driver.

If the feature IFLA_VXLAN_PROXY has been set and the packet is an ARP packet, the Linux kernel checks its ARP or NDP neighbour table, then it builds an ARP or respectively a NDP reply packet [NEIGHBOR REPLY] if an entry is found else, if the feature IFLA_VXLAN_L3MISS has been set, it notifies the Linux userland with a Netlink message RTM_GETNEIGH [L3MISS NOTIFICATION]. In any case, the packet is dropped.

The Linux kernel VxLAN receive function look up into its forwarding database in order to retrieve the corresponding VxLAN tunnel end points that had been configured. The lookup is done with the destination MAC address of the packet.

If a forwarding entry is found into the FDB and this forwarding entry is marked as a router (NTF_ROUTER) and the feature IFLA_VXLAN_RSC (route short circuiting) has been set, the Linux kernel checks its ARP or NDP table (based on the destination IP address):
- if an neighbor entry is found, the Linux kernel updates the source and destination MAC addresses of the packet and it performs a new look up from the forwarding database with the new destination MAC address. Then it continues with the following processing steps [STEP_NOFOUND].
- if no neighbor entry is found and the feature IFLA_VXLAN_L3MISS has been set, the Linux kernel sends a Netlink notification RTM_GETNEIGH [L3MISS NOTIFICATION] to the userland. A userland process may listen to this [L3MISS NOTIFICATION] and update the Linux kernel ARP or NDP tables.
- if no neighbor entry is found and the feature IFLA_VXLAN_L3MISS has not been set, the fast path [DATAPLANE] continues with the below steps [STEP_NOFOUND].

If no forwarding entry is found [STEP_NOFOUND] for the destination MAC address of the packet, the Linux kernel performs a second look up with a zero MAC address (00:00:00:00:00:00):
- if no forwarding entry is found, the packet is dropped. If the feature IFLA_VXLAN_L2MISS is set, the Linux kernel sends a Netlink notification RTM_GETNEIGH [L2MISS NOTIFICATION] to the userland before dropping the packet. A userland process may listen to this [L2MISS NOTIFICATION] and update the Linux kernel forwarding database.
- if a forwarding entry is found, the Linux kernel encapsulates (add the VxLAN headers and inherit of the TOS field, depending on the interface parameters) and then it sends a copy of the packet for each VxLAN tunnel end points (VTEP) that are into this FDB entry.

The challenge of a Linux-based OS processing for VxLAN packets is performance in terms of the number of processed packets per second.

Another drawback of the Linux-based OS processing for VxLAN packets relates to the number of CPU cycles consumed for processing each VxLAN packet: each processed packet uses a minimum number of CPU cycles, even though some hardware offloads, such as offload for the checksum, encapsulation/decapsulation, segmentation/reassembly, may be used.

There is therefore a need for providing a method for processing VxLAN packets in an environment controlled by an operating system with improved performances.

SUMMARY OF THE INVENTION

It is an object of the present subject disclosure to provide a method for processing VxLAN packets in an environment controlled by an operating system which method provides an increased number of processed VxLAN packets per time unit.

Another object of the present subject disclosure is to provide a method for processing VxLAN packets in an environment controlled by an operating system which method decreases the latency and CPU cycles of each VxLAN packet processing.

To achieve these objects and other advantages and in accordance with the purpose of the present subject disclosure, as embodied and broadly described herein, in an aspect of the present subject disclosure, a process for processing VxLAN data units in an environment that includes an operating system configured for processing VxLAN data units, and a fast path environment configured for receiving incoming VxLAN data units and capable of processing such VxLAN data units, the process comprising: obtaining VxLAN processing configuration parameters used by the operating system; configuring the fast path environment for processing received VxLAN data units based on the obtained parameters; selecting, at the fast path environment, at least one received VxLAN data unit for processing by the operating system.

The proposed method provides the benefits of offloading any settings from Linux OS for VxLAN towards a fast data plane that is dedicated to packet processing performance so the VxLAN packets do not need to hit anymore the Linux environment.

The present disclosure provides a new set of offloading for VxLAN settings of Linux OS in order to provide an accurate setting of the dataplanes for VxLAN processing within the dataplane itself so most of packets do not need to hit the Linux OS, so it becomes possible to sustain high throughput of packet processing for VxLAN traffic.

In an embodiment, the fast path may be configured such that, if a VxLAN incoming packet requires certain predetermined processing, such as updating a table because of new states, such processing may not be performed by the fast path, and the VxLAN packet may instead be redirected towards the processing function of the operating system network stack. This "slower path", which corresponds to the processing required for the incoming packet performed by the operating system network stack, is called the "exception path" in the following.

The Linux kernel is therefore used as a slow path, and for each updates of the slow path tables, that is, of the Linux kernel, the fast data plane may be notified about the corresponding updates.

Even if, in the exemplary case of Linux, a protocol such as Netlink may be used for providing such update information, other operating system elements may require to be updated at the operating system so that the offloading of VxLAN packets to a fast data plane is fully transparent. For example, the statistics of the processed packets (since not all of the incoming packets are processed by the slow path, i.e. not processed by the kernel anymore, but instead by the fast path data plane) may be fed back by the fast data plane with respect to the VxLAN packets processed thereby to the operating system kernel.

In an embodiment, in order to support updates of the slow path table entries, some packets may not be processed by the fast data planes and instead be selected as exception packets. Exception packets may be transferred from the fast data plane towards the slow path using some fast path to slow path APIs.

According to one or more additional aspects, disclosed is a device for processing VxLAN data units in a fast path environment comprising an interface circuit configured for receiving incoming VxLAN data units, and a control circuit configured for processing VxLAN data units, wherein the processing VxLAN data units includes selecting at least one received VxLAN data unit for processing by an operating system outside of the fast path environment.

In an embodiment, the control circuit of the device may be further configured for selecting a VxLAN data unit for which processing includes a VxLAN processing table entry update.

In an embodiment, the control circuit of the device may be further configured for selecting a VxLAN data unit for which processing includes the sending of a Netlink message to the userland of the operating system.

In an embodiment, the control circuit of the device may be further configured for selecting a VxLAN data unit for which processing includes responding to a specific request which the operating system kernel is able to handle.

The device may be implemented in a semiconductor device, integrated circuit, ASIC component, or in an electronic component implementing a combination of hardware and software functions, such as an FPGA component.

According to one or more additional aspects, disclosed is a computer program product comprising computer program code tangibly embodied in a computer readable medium, said computer program code comprising instructions to, when provided to a computer system and executed, cause said computer to perform a method for processing VxLAN data units according to the present subject disclosure.

According to yet other aspects, disclosed is a set of data representing, through compression or encoding, a computer program according to the present subject disclosure.

According to yet other aspects, disclosed is a non-transitory computer-readable storage medium storing a computer program that, when executed, causes a system comprising a processor operatively coupled with a memory, to perform a method for processing VxLAN data units in an environment that includes an operating system configured for processing VxLAN data units, and a fast path environment configured for receiving incoming VxLAN data units and capable of processing such VxLAN data units, the process comprising: obtaining VxLAN processing configuration parameters used by the operating system; configuring the fast path environment for processing received VxLAN data units based on the obtained parameters; and selecting, at the fast path environment, at least one received VxLAN data unit for processing by the operating system.

It should be appreciated that the present invention can be implemented and utilized in numerous ways, including without limitation as a process, an apparatus, a system, a device, and as a method for applications now known and later developed. These and other unique features of the system disclosed herein will become more readily apparent from the following description and the accompanying drawings.

BRIEF DESCRIPTION OF THE DRAWINGS

The present subject disclosure will be better understood and its numerous objects and advantages will become more apparent to those skilled in the art by reference to the following drawings, in conjunction with the accompanying specification, in which.

DETAILED DESCRIPTION OF THE DRAWINGS

Figure 1:
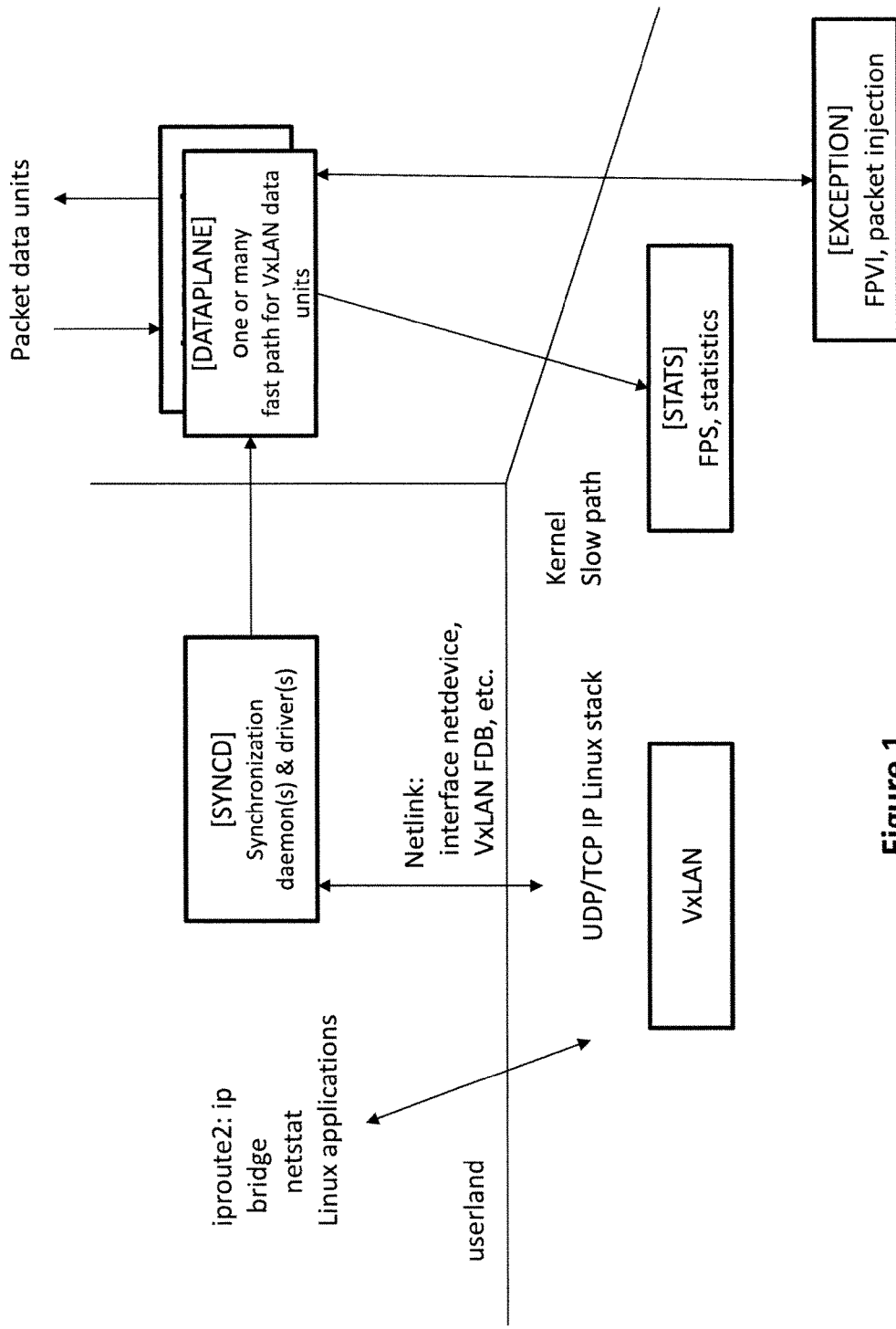
FIG. 1 is a diagram illustrating the synchronization mechanisms for the VxLAN Linux processing within some dataplanes, and FIG. 2.a and FIG. 2.b are diagram illustrating the packet processing of the VxLAN in a fast data plane while Linux OS is used a slow path according to an exemplary embodiment of the proposed process.

The advantages, and other features of the components disclosed herein, will become more readily apparent to those having ordinary skill in the art form. The following detailed description of certain preferred embodiments, taken in conjunction with the drawings, sets forth representative embodiments of the subject technology, wherein like reference numerals identify similar structural elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer. Examples of computer storage media include, but are not limited to, a flash drive or other flash memory devices (e.g. memory keys, memory sticks, key drive), CD-ROM or other optical storage, DVD, magnetic disk storage or other magnetic storage devices, memory chip, RAM, ROM, EEPROM, smart cards, or any other suitable medium from that can be used to carry or store program code in the form of instructions or data structures which can be read by a computer processor. Also, various forms of computer-readable media may transmit or carry instructions to a computer, including a router, gateway, server, or other transmission device, wired (coaxial cable, fiber, twisted pair, DSL cable), wireless (infrared, radio, cellular, microwave), or virtual transmission devices (virtual routers, virtual gateways, virtual tunnel end points, virtual firewall). The instructions may comprise code from any computer-programming language, including, but not limited to, assembly, C, C++, Visual Basic, HTML, PHP, Java, Javascript, Python, and bash scripting.

The fast path environment or any equivalent is used as an example of a set of dataplane primitives that can be either implemented in hardware (FPGA, ASICs) or software. The words dataplane and fast path can be used to describe the same technology as long as they describe technology that offload packet processing externally from Linux OS (aka the slow path).

Additionally, the word "exemplary", "for instance", "for example", "typically" as used herein means serving as an example, instance, or illustration. Any aspect or design described herein as "exemplary" is not necessarily to be construed as preferred or advantageous over other aspects or designs.

The present disclosure will now be described through the non-limiting example of a Linux operating system environment configured for processing VxLAN packets.

The "ip" and "bridge" tools may be used to configure VxLAN interfaces on Linux. For instance, a Linux VxLAN protocol endpoint data structure (usually referred to as a "VxLAN netdevice") can be created using the following command:

$ ip link add vxlan10 type vxlan id 10 group 239.0.0.10 dev eth1

The above exemplary specific command creates a new VxLAN netdevice named vxlan10, which will use the default Linux VxLAN port (8472) to setup the VxLAN UDP tunnel for the VxLAN network identifier 10. The default destination is the multicast group 239.0.0.10 on the interface eth1. This ip command may include further parameters in order to tune the tunnel interface.

Two different sets of parameters may be configured for defining a VxLAN netdevice: a first set of parameters includes generic interface parameters used by all types of netdevices (e.g. Ethernet, IP tunnel netdevices, etc.). This includes for instance a MAC address, Maximum Transmit Unit (MTU). A second set of parameters comprises VxLAN specific parameters.

The following lists the generic interface parameters and the VxLAN specific parameters currently available for configuration for a VxLAN netdevice:

```
(1) generic interface parameters
    $ ip link help
    Usage: ip link add [link DEV] [ name ] NAME
        [ txqueuelen PACKETS ]
        [ address LLADDR ]
        [ broadcast LLADDR ]
        [ mtu MTU ] [index IDX ]
        [ numtxqueues QUEUE_COUNT ]
        [ numrxqueues QUEUE_COUNT ]
        type TYPE [ ARGS ]
    ip link delete DEV type TYPE [ ARGS ]
    ip link set { dev DEVICE | group DEVGROUP } [ { up |
    down } ]
            [ arp { on | off } ]
            [ dynamic { on | off } ]
            [ multicast { on | off } ]
            [ allmulticast { on | off } ]
            [ promisc { on | off } ]
            [ trailers { on | off } ]
            [ txqueuelen PACKETS ]
            [ name NEWNAME ]
            [ address LLADDR ]
            [ broadcast LLADDR ]
            [ mtu MTU ]
            [ netns PID ]
            [ netns NAME ]
            [ alias NAME ]
            [ vf NUM [ mac LLADDR ]
                [ vlan VLANID [ qos VLAN-QOS ] ]
                [ rate TXRATE ] ]
                [ spoofchk { on | off} ] ]
                [ state { auto | enable | disable} ] ]
            [ master DEVICE ]
            [ nomaster ]
    ip link show [ DEVICE | group GROUP ] [up]
(2) VxLAN parameters
    $ ip link add vxlan10 type vxlan help
    Usage: ... vxlan id VNI [ { group | remote } ADDR ] [ local
    ADDR ]
        [ ttl TTL ] [ tos TOS ] [ dev PHYS_DEV ]
        [ dstport PORT ] [ srcport MIN MAX ]
        [ [no]learning ] [ [no]proxy ] [ [no]rsc ]
        [ [no]l2miss ] [ [no]l3miss ]
Where: VNI := 0-16777215
    ADDR := { IP_ADDRESS | any }
    TOS := { NUMBER | inherit }
    TTL := { 1..255 | inherit }
```

The VxLAN protocol may require configuring a mapping between certain L2 MAC addresses and IP addresses of the remote end points. Using Linux "bridge" management tools, this mapping can be monitored and updated. For instance, a default entry is created along with the creation of the above-described exemplary vxlan10 logical netdevice interface:

$ bridge fdb show dev vxlan10
00:00:00:00:00:00 dst 239.0.0.10 via eth1 self permanent
The users can update entries with the "bridge" tool:
$ bridge fdb add to 00:01:02:03:04:05 dst 192.168.9.8 dev vxlan10
$ bridge fdb show dev vxlan10
00:00:00:00:00:00 dst 239.0.0.10 via eth1 self permanent
00:01:02:03:04:05 dst 192.168.9.8 self permanent
Another example, the entries can be deleted:
$ bridge fdb del to 00:01:02:03:04:05 dev vxlan10
$ bridge fdb show dev vxlan10
00:00:00:00:00:00 dst 239.0.0.10 via eth1 self permanent In addition to static settings of the mapping, the VxLAN protocol allows for the mapping between L2 MAC addresses and IP addresses to be created, deleted, and/or updated dynamically (usually referred to as "learning"). On Linux, this dynamic learning can be disabled using the option "nolearning". Once entries are learned dynamically, they may expire after 5 minutes according to the default configuration or else be updated before expiring.

For instance, the dynamic learning of the above-mentioned exemplary vxlan10 logical netdevice interface can be displayed using:
$ bridge fdb show dev vxlan10
00:00:00:00:00:00 dst 239.0.0.10 via eth1 self permanent
fe:56:c2:e3:ee:41 dst 192.168.9.7 self
The following is an exemplary command invoked to remove a VxLAN interface (VxLAN netdevice):
$ ip link del vxlan10

Regardless of the currently available tools for creating/updating/deleting a VxLAN netdevice and their future evolutions, the Linux operating system is expected to continue relying on VxLAN logical netdevices in order to provide a management object for all the usual operations on Linux interfaces (Linux netdevices).

Further to the above-described usual operations on VxLAN netdevices (creation/update/deletion), other network management commands are available, including for managing VxLAN netdevices, such as for dumping interface statistics, tapping packets that are processed through these interfaces, or configuring firewalls, IPsec rules, routes, QoS, IPv4 or IPv6 settings.

A fast data plane, sometimes called the fast path of a forwarding element plane or the forwarding plane (or also the user plane of an IP Multimedia Subsystem or of a 3G/4G network, corresponds to a part of a physical or virtual network element architecture which is dedicated to processing incoming packets arriving on an inbound interface.

In the following the terms "fast data plane" and "fast path" will be used interchangeably.

A fast data plane typically uses a set of tables for retrieving from incoming packets information necessary to determine the processing required for each packet. For example, the fast data plane may perform actions on a networking packet such a decrementing the time-to-live (TTL) and, if the new TTL value is zero, discard the packet.

A fast path is usually designed so as to provide a high level of performance on the electronic component(s) or circuit(s) on which it is implemented. Such component(s) or circuit(s) may be a multicore CPU running dedicated software out of any OS kernels, microcodes of network processors, or ASIC(s) circuit device performing hardware processing.

FIG. 1 shows a synchronization daemon (process) (SYNCD) created in a Linux userland, and a VxLAN driver Kernel module instantiated in the Linux Kernel. Communication between the synchronization daemon and the VxLAN driver is implemented using the Netlink protocol. Depending on the implementation of the proposed process, a plurality of synchronization processes may be instantiated for handling various respective synchronization functions as described herein.

Also shown on FIG. 1 is a set of two fast data planes [DATAPLANE], each configured for receiving incoming VxLAN data units and capable of processing such VxLAN data units. Each of those fast data planes may be implemented in hardware or software, or a combination of hardware or software.

The single or plurality of fast data planes are implemented on a computing device, which may be a computer, computer network, or other device that has a processor, memory, data storage, and other associated hardware such as input/output interfaces (e.g. device interfaces such as USB interfaces, etc., network interfaces such as Ethernet interfaces, etc.), and depending on the embodiment a media drive for reading and writing a removable computer storage medium. The processor may be any suitable microprocessor, ASIC, and/or state machine. In some embodiments, the removable computer storage medium may contain computer instructions which, when executed by the computing device, cause the computing device to perform one or more example methods described herein. Thus, the removable computer storage medium may include instructions for implementing and executing the fast data plane(s) as well as other software processes (or daemons) described herein. In some embodiments, at least some parts of the example fast data plane may be stored as instructions on a given instance of the removable storage medium, removable device, or in local data storage, to be loaded into memory for execution by the processor. Specifically, software instructions or computer readable program code to perform embodiments may be stored, temporarily or permanently, in whole or in part, on a non-transitory computer readable medium such as a compact disc (CD), a local or remote storage device, local or remote memory, a USB key, or any other computer readable storage device.

Although the illustrated example fast data plane(s), synchronization daemon(s) and driver(s), VxLAN device Kernel module, operating system, statistics data unit and exception Kernel module are depicted as a program residing in memory, a fast data plane, synchronization daemon and driver, VxLAN device Kernel module, operating system, statistics data unit and/or exception Kernel module may be implemented as hardware, such as an application specific integrated circuit (ASIC) or as a combination of hardware and software, e.g. a Field Programmable Gate Array (FPGA) component or chipset.

Each fast data plane implement at least one VxLAN networking stacks, and may also, depending on the embodiment, instantiate a plurality of such VxLAN networking stacks, preferably corresponding to a plurality of VxLAN networking stacks (in a single VxLAN driver Kernel module) instantiated in the Linux Kernel. This multiple instantiation of VxLAN networking stacks as applied to a Linux Kernel is known as Linux network namespace (netns).

Such processing of VxLAN data units requires the configuration of some parameters which correspond to the settings used by the VxLAN driver Kernel module. The present subject disclosure provides a synchronization process for configuring the processing of VxLAN packets by the fast data plane, based on settings used by the VxLAN driver Kernel module. The proposed synchronization process is used by each fast data plane to obtain VxLAN processing configuration parameters used by the Linux operating system.

This synchronization process is transparent to the user of the VxLAN driver Kernel module in that there is no interaction required from such user nor any disruption on the performances of the VxLAN driver Kernel module packet processing.

In particular, the processing of VxLAN data units involves the mapping between Layer 2 addresses and Layer 3 addresses, as described above. The fast data planes may populate their respective VxLAN tables (with data such as route entries, firewall states, IPsec tables) as part of the synchronization process with the VxLAN driver Kernel module. For example, in case of the 6WINDGate technology, the synchronization mechanism is implemented using the Cache Manager, the Fast Path Manager and the FPC (Fast Path Cache manager) APIs, but any other synchronization implementations can be used.

In an embodiment, the synchronization between the VxLAN driver Kernel module and a fast data plane for processing VxLAN data units may use the Netlink protocol. A detailed description of the Netlink protocol may be found in http://www.carisma.slowglass.com/~tgr/libnl/doc/core.html.

In particular, the Linux Netlink protocol has been extended to include support for the VxLAN protocol.

In the embodiment illustrated by FIG. 1, the synchronization daemon is configured to issue Netlink request messages to the Linux Kernel, for requesting transfer of VxLAN processing configuration parameters used by the operating system. Upon receipt of this request, the Linux Kernel retrieves the generic interface parameters, and request the VxLAN specific parameters from the VxLAN driver Kernel module.

Within a Linux environment these parameters can be transparently synchronized thanks to Netlink. The Netlink kernel API NETLINK_ROUTE (rtnetlink) may for instance be used.

In an embodiment, the synchronization includes all changes and updates in the VxLAN interface configuration (including creation, modification and deletion of an interface). To that end, the synchronisation daemon opens a Netlink socket on this API, and listens to the Netlink group RTMGRP_LINK and RTMGRP_NEIGH. Whenever a VxLAN netdevice (VxLAN interface) is created or updated, the Linux kernel sends a rtnetlink message with the type RTM_NEWLINK. When an interface is deleted, the rtnetlink message type is RTM_DELLINK.

In an embodiment using netns and a corresponding plurality of VxLAN networking stack instantiations at a fast data plane, a Netlink socket may be opened for each netns instantiation corresponding to an instantiation in the fast data plane. The netns, on which the rtnetlink messages are received, indicates the corresponding instantiation of VxLAN networking stack in the fast data plane for which the VxLAN interface parameters may be configured.

The header of the RTM_DELLINK or RTM_NEWLINK message (struct ifinfomsg) may include the interface index and the interface flags (IFF_*). The family (ifi_family) may be set to AF_UNSPEC. Further information may be obtained thanks to the attributes (IFLA_*) that are embedded into the rtnelink RTM_DELLINK or RTM_NEWLINK message. Some of these attributes (like IFLA_LINKINFO) embeds other kind of attribute.

The following Linux rtnelink RTM_DELLINK or RTM_NEWLINK message attributes are notified by the Kernel to the synchronization daemon when VxLAN netdevice interfaces are created/updated/deleted:

IFLA_IFNAME: the name of the interface
IFLA_ADDRESS: the MAC address
IFLA_MTU: the MTU
IFLA_AF_SPEC: information specific to protocol family
AF_VRF: information about netns
IFLA_VRF_LINKVRFID: the netns of the link part (ie the netns for packet i/o)
IFLA_LINKINFO: information specific to the driver
IFLA_INFO_KIND: the type of the interface. For VXLAN, this attribute is set to "vxlan".
IFLA_INFO_DATA: VXLAN parameters
IFLA_VXLAN_ID: the VXLAN Network Identifier
IFLA_VXLAN_GROUP: the default IPv4 VXLAN group
IFLA_VXLAN_LINK: the default output interface
IFLA_VXLAN_LOCAL: the default IPv4 source address of VXLAN packets
IFLA_VXLAN_TTL: the TTL of VXLAN packets
IFLA_VXLAN_TOS: the TOS of VXLAN packets (if the value is 1, then TOS is inherited from the inner packet.
IFLA_VXLAN_LEARNING: learning status of the interface
IFLA_VXLAN_AGEING: default lifetime of learning FDB entries
IFLA_VXLAN_LIMIT: the maximum FDB entries for this interface
IFLA_VXLAN_PORT_RANGE: the port source range of VXLAN packets
IFLA_VXLAN_PROXY: allows ARP reduction (whereby a bridge-connected VXLAN tunnel endpoint answers ARP requests from the local bridge on behalf of remote DOVE clients)
IFLA_VXLAN_RSC: allows L3 switching (known destination IP addresses use the corresponding destination MAC address for switching rather than going to a (possibly remote) router first)
IFLA_VXLAN_L2MISS: notify userspace when a entry is missing in the FDB
IFLA_VXLAN_L3MISS: notify userspace when a entry is missing in the FDB (depends on IFLA_VXLAN_PROXY).
IFLA_VXLAN_PORT: destination port (note that the default linux destination port (8472) is not the one chosen by the IANA (4789))
IFLA_VXLAN_GROUP6: the default IPv6 VXLAN group
IFLA_VXLAN_LOCAL6: the default IPv6 source address of VXLAN packets The attribute AF_VRF does not exist in a vanilla Linux, however can be added therein in order to enrich the netns synchronization information.

VxLAN requires a specific database which is named FDB—forwarding data base—. In an implementation, when some FDB entries are created or updated, the Linux kernel may send a rtnetlink message with the type RTM_NEWNEIGH. When some FDB entries are removed, the Linux kernel may send a rtnetlink message with the type RTM_DELNEIGH.

The header of the RTM_NEWNEIGH or RTM_DELNEIGH message uses the struct ndmsg. For the FDB entries, the family (ndm_family) may be set to AF_BRIDGE. The field ndm_ifindex may indicate the interface to which the message is related. The ndm_state field may be used to determine if this FDB entry is permanent or learnt by the VxLAN driver Kernel module. Other information may be embedded into the following attributes (NIDA_*):

NDA_LLADDR: the MAC address of the FDB entry
NDA_DST: the destination IP (IPv4 or IPv6) address
NDA_IFINDEX: the output interface index
NDA_PORT: the destination UDP port
NDA_VNI: the destination VXLAN Network Identifier
NDA_CACHEINFO: the last used and updated time As shown on FIG. 1, the synchronization daemon(s) parse received information including VxLAN Netlink attributes for the interface states or the FDB, and configure, based on such received information, the fast data plane tables for processing VxLAN packets.

In an implementation, the VxLAN attributes from Linux kernel may be translated into data structures used by the fast data plane(s), preferably by the drivers of the synchronization daemon(s). This synchronization daemon can be configured to provision a local fast path—local [DATAPLANE]- or a set of remote fast path—remote [DATAPLANE]—depending on the system being used.

The fast data plane(s) receive configuration information to be used to process incoming VxLAN packets. This provides the benefit of avoiding the need to go through the Linux kernel for at least some of the incoming VxLAN packets. This also provides the additional benefit of offloading most of the packets into the fast path, that is, allowing the routing of incoming VxLAN packets directly through the fast data plane for further processing.

The fast data plane(s) may also be configure so as to select at least one received VxLAN data unit for processing by the operating system, that is, by the VxLAN driver Kernel module.

In an implementation, any VxLAN packet which would require a processing beyond the processing scope of the fast data plane(s) is steered towards the VxLAN driver Kernel module. Such an exception VxLAN packet may be sent to an exception Kernel module (shown on FIG. 1, as [EXCEPTION]) for being processed by the Linux network stack.

For example, depending on the implementation of the proposed process, a VxLAN packet for which processing would require a table entry update may be selected as exception VxLAN packet and not offloaded for processing by a fast data plane. Likewise, depending on the implementation of the proposed process, a VxLAN packet for which processing would require the sending of a Netlink message to the userland may also be selected as exception VxLAN packet and not offloaded for processing by a fast data plane. Also, depending on the implementation of the proposed process, a VxLAN packet for which processing includes responding to a specific request which the Kernel would be able to handle, may also be selected as exception VxLAN packet and not offloaded for processing by a fast data plane.

Also shown on FIG. 1 is a statistics data unit ([STATS]) which comprises one or several daemons and one or several drivers.

In an embodiment of the proposed process, the incoming VxLAN packets are not handled by the Linux Kernel and are instead offloaded into the one or several fast data planes. However, the Linux Kernel may operate more efficiently if it is provided with accurate statistics on the processing of the packets even though such processing is not in full performed by the VxLAN driver Kernel module. In addition, if the kernel has some timers that should be updated based on some traffic, they would likely expire because of lack of visibility on the traffic.

Therefore, in order for Linux to be operated fully transparently, the statistics data unit shown on FIG. 1 may be used in an embodiment to update the Linux Kernel with statistics on the VxLAN packet processing performed by the fast data plane(s).

The statistics data unit may be configured to provide the Kernel with a coherent view of the processed VxLAN packets so that conventional statistics tools, such as "ip", "iproute2", "bridge", "netstat", "/proc file system entries" or any Linux tools developed to monitor Linux VxLAN, can be used transparently. The kernel timers may also be refreshed based on information received from the statistics data unit.

Referring now to FIGS. 2a and 2b, an ingress VxLAN hook is added on the ingress path (likely IP local demux) [2a1] of a fast data plane in order to receive and to intercept all packets with a destination address of the forwarding element (the host) and with an UDP [2a2] port that matches one of a VxLAN interface. Upon receipt of the VxLAN packet to be processed, the fast data plane checks the VxLAN Network Identifier [2a4] in order to determine the corresponding VxLAN interface. If any of the processing of the VxLAN header (including UDP and IP) is not parsed properly [2a3] or before [2a1] because, either some packet headers are unexpected or either the VxLAN tables are not populated yet, the fast data plane may update the statistics data unit [STATS] and may choose to either drop the packet or send the packet to the Linux kernel through the [EXCEPTION] API.

According to an embodiment, if the feature VXLAN_LEARNING [2a5] has been set [2a5.y], the fast data plane [DATAPLANE] may check if there is an entry into the forwarding database (FDB) [2a6] for the inner source MAC address of the VxLAN packet. If not [2a6.nf], the packet may be sent from the [DATAPLANE] to the Kernel using the [EXCEPTION] API so that the Linux kernel slow path can update the FDB database. Then, a synchronization daemon [SYNCD] may provide this update using its fast path driver to the [DATAPLANE]. If required, the slow path can complete the processing of the packet if it is not processed anymore by the fast path [DATAPLANE]. The proper fast path [DATAPLANE]'s statistics [STATS] may be updated. As part of the [STATS] (2a7) of the present subject disclosure, the fast path [DATAPLANE] may update the usage counters of the entries so, thanks to [STATS] the Linux kernel shall not expire the entries even though the VxLAN packets are not processed through the Linux kernel. In case of no entry being used by the fast path [DATAPLANE] the [STATS] entries are not updated, then the Linux kernel may expire such VxLAN entries from its FBD. Once they are expired by Linux kernel, the [SYNCD] is notified by Netlink so the fast path [DATAPLANE]'s FDB is updated and this entry is deleted from the fast path.

According to an embodiment, if the feature VXLAN_LEARNING has not been set (2a5.n) or if the FDB of the [DATAPLANE] is already synchronized with a proper status (2a6.f), then the packet is decapsulated (2a8) (the VxLAN header may be removed and the ECN status updated accordingly) and injected into the next processing stages of the fast path [DATAPLANE] network stack. For example, in an embodiment, the L2 packet that was encapsulated with a VxLAN header may be injected back into the L2 input function (2a10) of its fast path [DATAPLANE]. The proper fast path [DATAPLANE]'s statistics [STATS] may also be updated (2a9).

According to an embodiment, when the fast path [DATAPLANE] needs to send a packet via a VxLAN interface, it calls the next stage of processing function of the fast path [DATAPLANE] such as the transmit or the IP output function (2*b*1). In addition, the proper fast path [DATAPLANE]'s statistics [STATS] may be updated.

According to an embodiment, if the feature VXLAN_PROXY (2*b*2) has been set and the packet is an ARP or NDP packet, the fast path [DATAPLANE] verification function may decide to send the packet into the slow path through the [EXCEPTION] API (2*b*2.*t*). The proper fast path [DATAPLANE]'s statistics [STATS] may in addition be updated. Hence the Linux kernel slow path may perform the required actions.

According to an embodiment, the VxLAN fast path [DATAPLANE] egress function can look up into its forwarding database (2*b*3) in order to retrieve the corresponding VxLAN tunnel end points that had been configured into the fast path [DATAPLANE] from the [SYNCD] process. The lookup may be performed using the destination MAC address of the packet.

According to an embodiment, if a forwarding entry is found (2*b*3.*f*) into the FDB of the fast path [DATAPLANE] and this forwarding entry is marked as a router and the feature IFLA_VXLAN_RSC (route short circuiting) has been set (2*b*4), (2*b*4.*y*) the fast path [DATAPLANE] checks its ARP or NDP table (2*b*8) (based on the destination IP address):

- if an neighbor entry is found (2*b*8.*f*) by the fast path [DATAPLANE], it updates the source and destination MAC addresses of the packet (2*b*9) and it performs a new look up (2*b*10) from the forwarding database with the new destination MAC address. Based on this processing, the respective statistics of the fast path are updated so the [STATS] API of the Linux kernel is made aware of such processing. Then the fast path [DATAPLANE] continues with the following processing steps (2*b*10.*f* or 2*b*10.*nf*).
- if neighbor entry is not found (2*b*8.*nf*) and the feature VXLAN_L3MISS (2*b*11) has been set (2*b*11.*y*), the packet is sent from the fast path [DATAPLANE] toward the slow path (2*b*12) thru the [EXCEPTION] API so that the Linux kernel sends a Netlink notification (l3miss) to the userland. If any userland process listens to this Netlink notification (l3miss) and updates the kernel neighbour tables, then the [SYNCD] synchronization process of this invention may synchronize the fast path [DATAPLANE]'s ARP or NDP so any other upcoming packets may be processed only into the fast path [DATAPLANE].
- if neighbor entry is not found (2*b*8.*nf*) and the feature VXLAN_L3MISS (2*b*11) has not been set (2*b*11.*n*), the fast path [DATAPLANE] continues with the below encapsulation steps (2*b*6).

For all previous processing, the proper fast path [DATAPLANE]'s statistics [STATS] may be updated according to the processed cases of the VxLAN packets.

If no forwarding entry is found in the forwarding database for the destination MAC address of the packet (2*b*3.*nf*), the fast path [DATAPLANE] performs a second look up with a zero MAC address (00:00:00:00:00:00) (2*b*5):

- if no forwarding entry is found (2*b*5.*nf*), the packet is sent from the fast path [DATAPLANE] toward the slow path thru the [EXCEPTION] API. This API may describe the remaining processing to be done by the Linux OS kernel so the packet will terminate its transmission processing through the output function of the Linux kernel of the specified interface by the [EXCEPTION] API. In order to avoid other packets to continue being sent to the Linux kernel, the Linux kernel may notify its userland of a required entry using Netlink (l2miss). Then, if any userland process listens to this Netlink notification (l2miss) and update the kernel states, then the [SYNCD] synchronization process may synchronize the fast path [DATAPLANE]'s FDB so any other upcoming packets may be processed only into the fast path [DATAPLANE].
- if a forwarding entry is found (2*b*5.*f*, 2*b*4.*n*, 2*b*11.*n*, 2*b*10.*f*), the fast path [DATAPLANE] encapsulates (2*b*6) (add the VxLAN headers) and then it sends a copy of the packet for each VxLAN tunnel end points (VTEP) (2*b*7) that are into the fast path [DATAPLANE] tables. For this transmission process, the fast path [DATAPLANE] uses the VxLAN interface parameters (TTL, TOS (inherit or new value), destination port, VxLAN Network Identifier, source port range, source address, default output interface, output netns) that had been provisioned by the [SYNCD]'s drivers and the VxLAN packet may be further processed by other stages of the fast data plane.

The proper fast path [DATAPLANE]'s statistics [STATS] may be updated according to the processed cases. For example, each lookup into the fast path [DATAPLANE]'s forwarding database may lead to update usage counters [STATS] of the matched entry.

According to an embodiment, while the packets are being processed by any stage of the fast path [DATAPLANE], it may updates (usually, they are mainly counters to be incremented) efficiently its counters so they can be provided to the Linux kernel stacks using the VxLAN [STATS] API.

While the invention has been described with respect to preferred embodiments, those skilled in the art will readily appreciate that various changes and/or modifications can be made to the invention without departing from the spirit or scope of the invention as defined by the appended claims. In particular, the invention is not limited to specific embodiments regarding the operating system or fast data plane and may be implemented using various architecture or components thereof without departing from its spirit or scope as defined by the appended claims.

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and subcombinations of the features and aspects can be made and still fall within the scope of the invention. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

In particular, the invention does not exclude some pre-processing and post-processing of VxLAN packets before the packets hit the fast path dataplane. For instance, such pre-processing and post-processing can be some pre-computing of hashes on packet headers, IP header checksum, or packet segmentation and reassembly (typically GRO, LRO, TSO, RSC).

According to the present disclosure, a L2 packet from a VxLAN payload can be processed and forwarded between physical and logical interfaces. For example, L2 packets may be routed towards virtual machines of a local host, towards other VxLAN interfaces, or towards any interface of the system.

The invention claimed is:

1. A computer-implemented method for processing VxLAN data units in an environment the method comprising:
   obtaining VxLAN processing configuration parameters used by an operating system configured for processing VxLAN data units, said operating system being included in the environment;
   configuring a fast path environment for processing received VxLAN data units based on the obtained parameters, said fast path environment being included in the environment and dedicated to Processing incoming packets arriving on an inbound interface, wherein the fast path environment is configured for receiving incoming VxLAN data units and processing such VxLAN data units; and
   selecting, at the fast path environment, at least one received VxLAN data unit for processing by the operating system.

2. The method according to claim 1, wherein the selecting of at least one received VxLAN data unit includes selecting a VxLAN data unit for which processing includes a VxLAN processing table entry update.

3. The method according to claim 1, wherein the operating system is the Linux operating system, and wherein the selecting of at least one received VxLAN data unit includes selecting a VxLAN data unit for which processing includes the sending of a Netlink message to a userland of the operating system.

4. The method according to claim 1, wherein the selecting at least one received VxLAN data unit includes selecting a VxLAN data unit for which processing includes responding to a specific request which the operating system kernel is able to handle.

5. A device for processing VxLAN data units, the device comprising an interface circuit configured for receiving incoming VxLAN data units, and a control circuit with a fast path environment dedicated to processing incoming packets arriving on an inbound interface, configured for processing VxLAN data units, wherein the processing VxLAN data units includes selecting at least one received VxLAN data unit for processing by an operating system outside of the fast path environment.

6. The device of claim 5, wherein the control circuit is further configured for selecting a VxLAN data unit for which processing includes a VxLAN processing table entry update.

7. The device of claim 5, wherein the operating system is the Linux operating system, and wherein the control circuit is further configured for selecting a VxLAN data unit for which processing includes the sending of a Netlink message to a userland of the operating system.

8. The device of claim 5, wherein the control circuit is further configured for selecting a VxLAN data unit for which processing includes responding to a specific request which the operating system kernel is able to handle.

9. A non-transitory computer-readable storage medium storing a computer program that, when executed, causes a system comprising a processor operatively coupled with a memory, to perform a method for processing VxLAN packets in an environment that includes an operating system configured for processing VxLAN data units, and a fast path environment dedicated to processing incoming packets arriving on an inbound interface, wherein the fast path environment is configured for receiving incoming VxLAN data units and processing such VxLAN data units, the method comprising: obtaining VxLAN processing configuration parameters used by the operating system; configuring the fast path environment for processing received VxLAN data units based on the obtained parameters; and selecting, at the fast path environment, at least one received VxLAN data unit for processing by the operating system.

* * * * *

UNITED STATES PATENT AND TRADEMARK OFFICE
CERTIFICATE OF CORRECTION

PATENT NO. : 10,237,130 B2
APPLICATION NO. : 15/301652
DATED : March 19, 2019
INVENTOR(S) : Dichtel et al.

Page 1 of 1

It is certified that error appears in the above-identified patent and that said Letters Patent is hereby corrected as shown below:

On the Title Page

Item (57) ABSTRACT, Line 3, please delete "VSLAN" and insert -- VxLAN --.

Signed and Sealed this
Seventh Day of May, 2019

Andrei Iancu
*Director of the United States Patent and Trademark Office*